No. 862,994. PATENTED AUG. 13, 1907.
J. H. PHILLIPS, Jr.
PIPE COUPLING.
APPLICATION FILED NOV. 9, 1906.
3 SHEETS—SHEET 1.
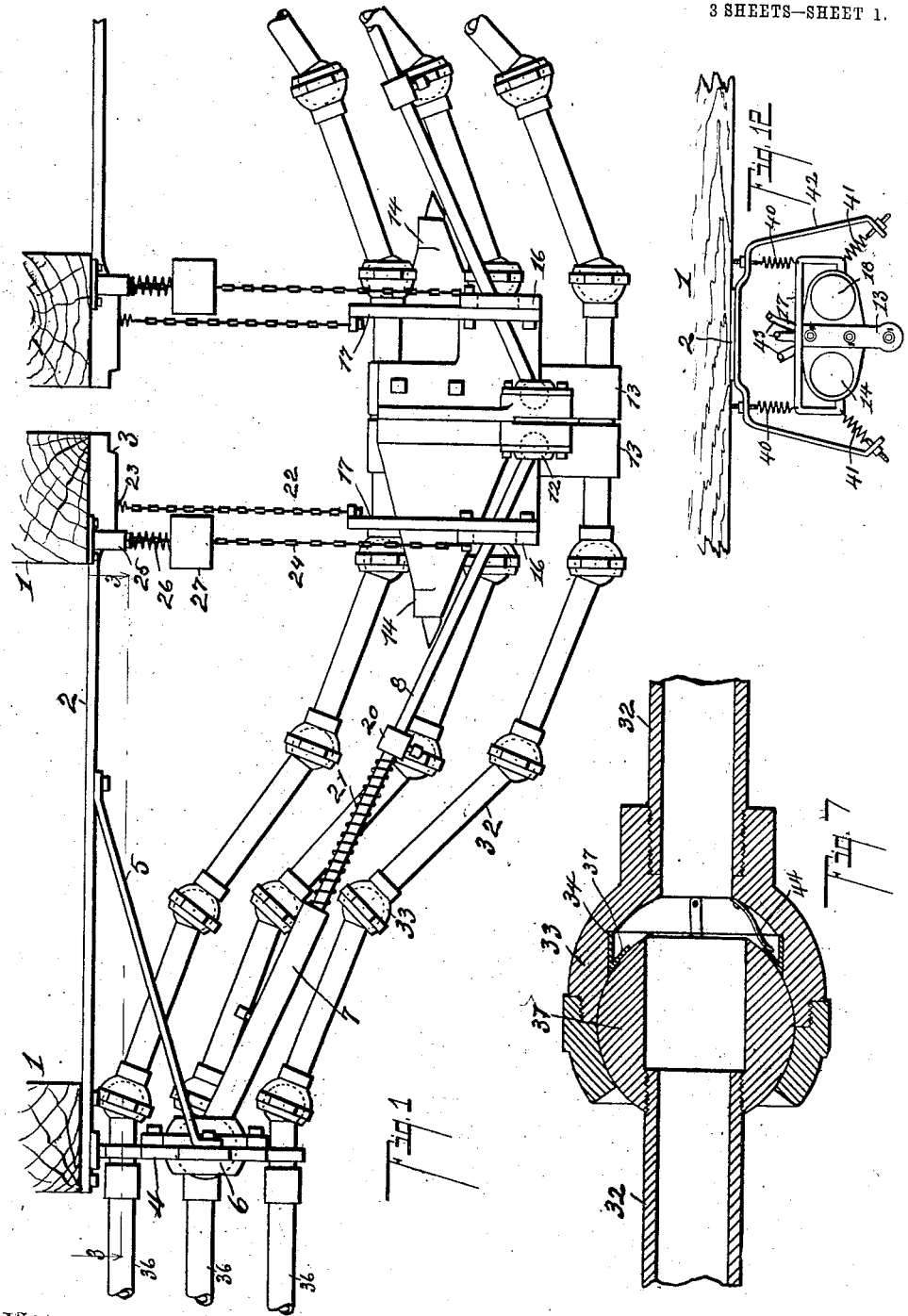
Witnesses:
Inventor,
John Henry Phillips Jr.
By
Att'ys

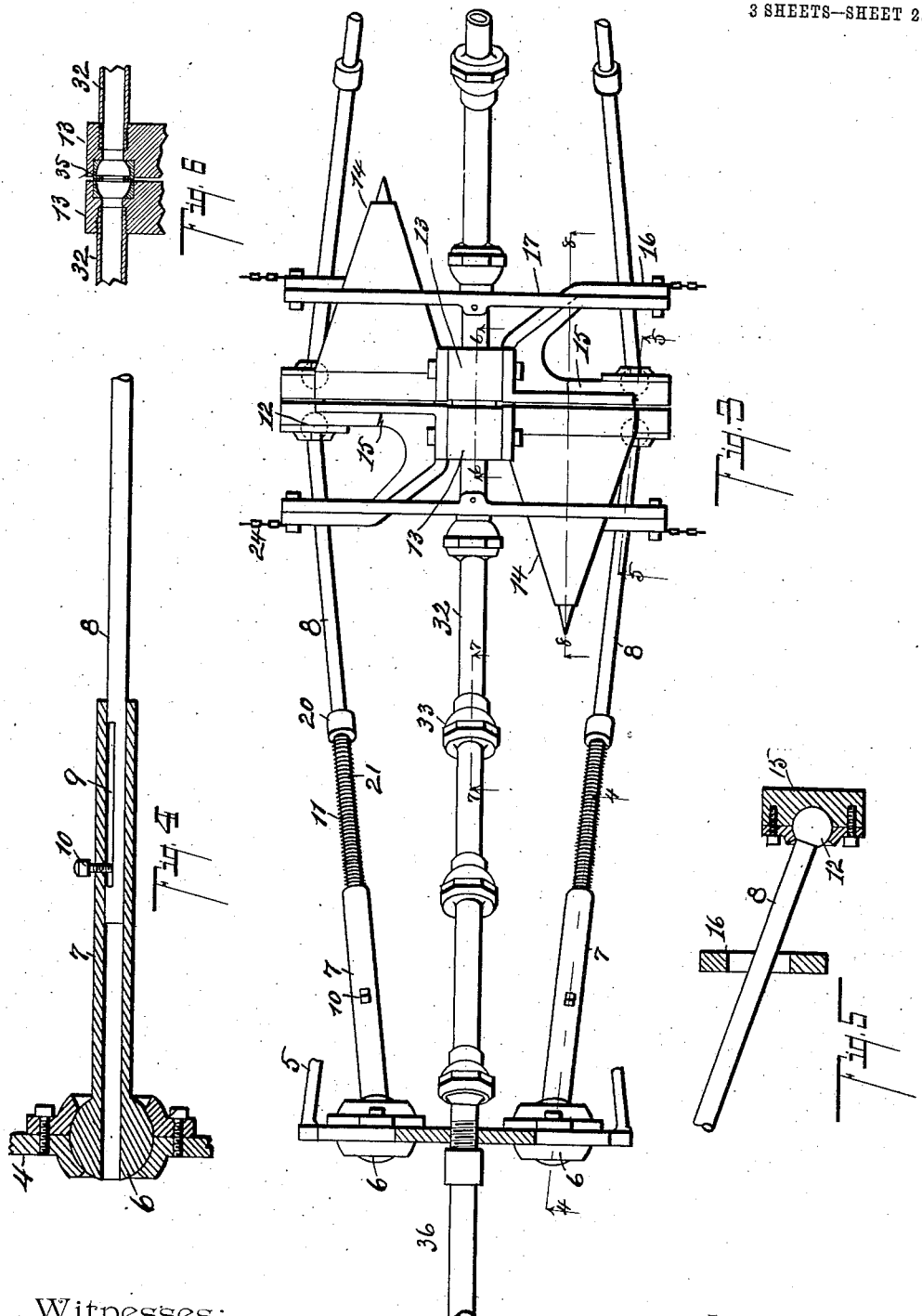

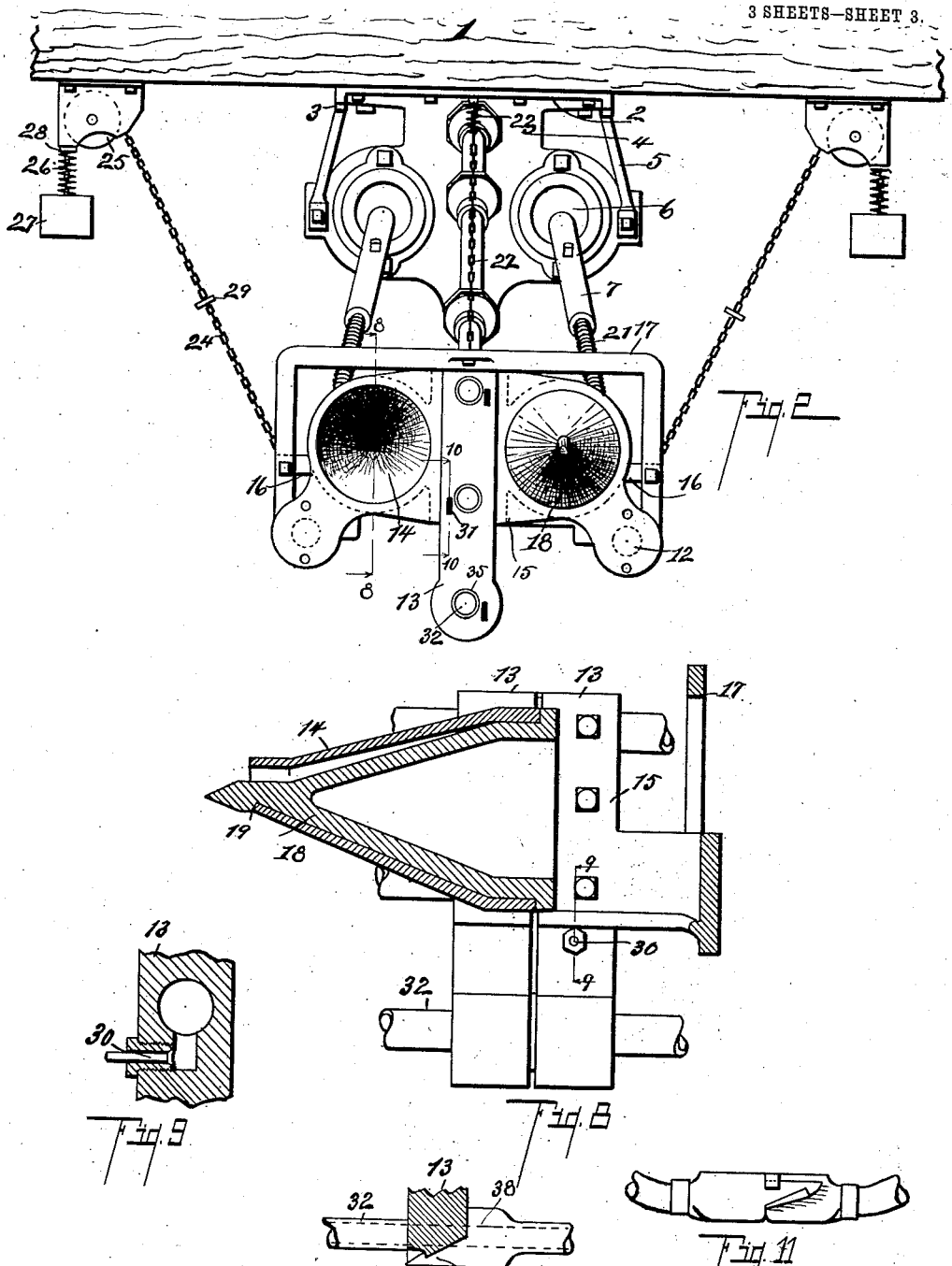

UNITED STATES PATENT OFFICE.

JOHN HENRY PHILLIPS, JR., OF JACKSON, MICHIGAN.

PIPE-COUPLING.

No. 862,994.   Specification of Letters Patent.   Patented Aug. 13, 1907.

Application filed November 9, 1906. Serial No. 342,701.

*To all whom it may concern:*

Be it known that I, JOHN HENRY PHILLIPS, Jr., a citizen of the United States, residing at the city of Jackson, county of Jackson, and State of Michigan, have invented certain new and useful Improvements in Pipe-Couplings, of which the following is a specification.

This invention relates to improvements in pipe or hose couplings.

My improved pipe or hose coupling is particularly adapted and, as shown herein, is designed for use as a coupling for the steam and air pipes of railway trains, although it is applicable and desirable for use in various other relations.

The objects of this invention are, first, to provide an improved coupling for the pipes of railway trains which is adapted to be automatically coupled and uncoupled upon the coupling and uncoupling of the cars. Second, to provide an improved coupling for the pipes of railway trains which is adapted to automatically couple or uncouple all of the pipes of a train, both steam and air, upon the coupling or uncoupling of the cars. Third, to provide an improved coupling for the pipes of railway trains, in which a car having a combined or combination coupling may be readily coupled or connected to a car equipped with individual couplings. Fourth, to provide a coupling for the steam and air pipes of railway trains by which the use of rubber hose is dispensed with. Fifth, to provide an improved pipe or hose coupling which is very durable in use and one which is comparatively simple and economical in structure and very convenient in use.

Further objects, and objects relating to structural details, will definitely appear from the detailed description to follow.

I accomplish the objects of my invention by the devices and means described in the following specification. The invention is clearly defined and pointed out in the claims.

A structure embodying the features of my invention is clearly illustrated in the accompanying drawing, forming a part of this specification, in which, Figure 1 is a detail side elevation of my improved coupling, the structure here shown being designed for use as a coupling for the steam and air pipes of railway trains. Fig. 2 is a front end elevation of one of the coupling members, it being shown in its lower or depressed position, or in the position shown in Fig. 1. Fig. 3 is a detail horizontal section taken on a line corresponding to line 3—3 of Fig. 1. Fig. 4 is an enlarged detail longitudinal section taken on a line corresponding to line 4—4 of Fig. 3, showing structural details of one of the connecting links for the coupler head to the rear plate of the frame. Fig. 5 is an enlarged detail section thereof, taken on a line corresponding to line 5—5 of Fig. 3, showing details for the connections for these links to the heads. Fig. 6 is a detail section taken on a line corresponding to line 6—6 of Fig. 3, showing the coupling lips of the coupling members. Fig. 7 is an enlarged detail longitudinal section through one of the joints for the pipe sections 32. Fig. 8 is an enlarged detail section taken on a line corresponding to line 8—8 of Fig. 3, showing details of the engaging members of the couplings. Fig. 9 is an enlarged detail taken on a line corresponding to line 9—9 of Fig. 8, showing the arrangement of the drain valve 30. Fig. 10 is a detail section taken on a line corresponding to line 10—10 of Fig. 2, showing an individual coupling attached to the main coupling. Fig. 11 is a detail side elevation of a modified form of the individual coupling, a pair of individual couplings being shown connected. Fig. 12 is a front elevation, corresponding to Fig. 2, of a modified construction, the coupler head being supported entirely by springs and connected to the train pipes by rubber hose instead of the flexible pipes made up of sections.

In the drawing, the sectional views are taken looking in the direction of the little arrows at the ends of the section lines, and similar reference characters refer to similar parts throughout the several views.

Referring to the drawing, 1—1 represent the frame of a railway car. On the under side of this frame is a longitudinal bar 2, having a cross-piece 3 at its forward end. At the rear end of the bar 2 is a vertically arranged rear plate 4. This plate is preferably braced from the bar 2 by the braces 5. The coupling head 15 is connected to this plate by a pair of links. These links are preferably made up of sections 7 and 8, the sections 8 being telescopically arranged within the sections 7. The ends of the sections 8, which telescope within the sections 7, are provided with longitudinal grooves 9 in which the set screw 10 engages. This serves to limit the longitudinal adjustment or movement of the sections upon each other and secures them together. The coiled springs 21, arranged upon the sections 8, hold the same normally forward, the rear ends of the springs engaging the ends of the link sections 7, and the forward ends engaging collars 20 which are adjustably secured upon the sections 8.

The forward ends of the link sections 7 are provided with suitable balls 12 arranged in suitable sockets on the head 15. The rear link sections 7 are provided with balls 6 which are arranged in suitable sockets in the rear plate 4. These links are preferably arranged to diverge forwardly, yieldingly holding the coupler head forwardly and in alinement with the plates 4. The head 15 is provided with rearwardly and outwardly projecting arms 16 having holes therein through which the links are arranged; see Fig. 5. To these arms 16 is secured an inverted yoke-like supporting frame 17; see Figs. 2 and 3. Weights 27 are connected to the coupler head by chains 24 arranged over suitable pulleys 25 on the frame 1. The weights 27 are sufficient to normally hold the coupler head, the same being shown in its lower position. Stops 29 are provided for the chains 24 to limit the upward movement of the coupler head, its downward movement being checked by the chain 22. At the upper end of this chain is a coiled spring 23. Buffer springs 26 are provided for the weights 27, the springs being arranged on the chains 24. On each coupler head, at one side of the head block 13, is a conical rigid latch 18 having a hook 19 at its outer end. On the other side of the head block is a conical socket 14 with an opening through the inner end thereof, adapted to receive the hook portion of the latch 18, the socket of one head plate being adapted to receive and latch the other. The conical socket is slightly flattened at its inner end to permit a slight rocking of the latch therein, so that by tilting the heads rearwardly the latch is disengaged. These latches and sockets are preferably made conical so that they serve to guide and center the coupling members relative to each other. The weights 27 are, as stated, normally adapted to hold the coupling members in an elevated position.

When two cars to be coupled are brought together, the latch 18, entering the socket 14, guides the members together, and, as the coupler heads are held normally outward by their supporting arms, the pressure of the coupler heads against each other forces them downwardly to the position indicated in the drawings, in which position the head blocks are brought face to face and in contact. The coupling block heads are provided with coupling lips 35 which are in contact when the heads are in this position. The details of these coupling lips are not here pointed out, as they are described in detail and claimed in the co-pending application filed concurrently herewith. When the cars are uncoupled, the pressure of the coupler heads is released, so that they are elevated by the weights 27. At a certain point in this upward movement, the heads are rocked or tilted rearwardly, breaking the contact of the coupling blocks and disengaging the latches. This is preferably accomplished by passing the links through the openings in the arms 16 of the coupler head, as described. The links engaging the arms tilt the heads, as will be readily apparent. The head blocks are preferably provided with a plurality of couplings proper 35, which are arranged in a vertical series.

The coupler heads are connected by flexible pipes or hose to the steam and air pipes 36 of the car. These flexible pipes are preferably made up of sections 32 connected by ball-and-socket joints, the ball-and-socket joints preferably consisting of a socket 33 and a ball 37. The joints are provided with packing rings 34 which are seated in the socket 33 and are provided with a yielding flange-like portion 37, adapted to bear against the ball. These rings are preferably made of thin metal, so that they yield under the pressure of the steam or air and are held in position thereby, forming a perfectly tight joint. To insure contact when the steam is turned on springs 38 are provided. At the same time, the pressure and binding effect thereof is not sufficient to be objectionable. When the steam is off, as is the case where the greatest movement of the joints takes place, the parts move very freely and with a minimum wear. By the use of a flexible pipe in this relation formed of sections, as shown and described, the use of rubber hose is dispensed with, so that a more durable structure is secured.

In the structure illustrated, I have shown the coupling adapted for the steam and air brake and air whistle.

To arrange the structure for use in connection with the couplings having individual coupling members 38, I provide the head blocks 13 with sockets 31 adapted to receive the latches 39 of the individual coupler members. These catches are so arranged that they effectively guide the coupler members into proper position to bring the lips thereof together. These individual coupler members must, however, be guided into place by hand.

I have illustrated in Fig. 12 a modified construction, in which the coupler heads are supported entirely by springs 40 and 41. The suspending frame 42 in this construction has depending arms at each side so that the springs 40 and 41 are arranged to hold the coupler heads in a central position. The rear plate and supporting arms are in this construction omitted and rubber hose 43 or suitable jointed pipes substituted. My improved coupling is, as stated, particularly adapted for use as a coupling for the pipes of railway trains, and I have illustrated the same adapted for that use, although it is desirable, and certain features are applicable, for use in other relations.

In the modified construction, the upper pair of supporting arms 42 are arranged to tilt the coupling members forwardly as they are depressed by each other when brought into contact and causing the guide latches to lock and hold them securely together. As the trains parts, the movement, as the coupling members swing upwardly when released, is reversed and the engaged members readily disengage. In addition to this, a greater amount of steam or air pressure being below the center line of the guide arms tends to hold them more securely in their engaging position as more pressure is added.

My improved hose or pipe coupling is adapted to automatically couple or uncouple upon the coupling or uncoupling of the train. The same forms a very secure joint, and one which is practically impossible to become detached without uncoupling the cars. While I have illustrated the same as a combination coupler, that is, a coupling for a plurality of pipes, it is evident that it might be adapted for a single pipe.

I have illustrated and described my improved coupling in detail in the form preferred by me on account of its structural simplicity and economy and convenience in use. I am aware, however, that it is capable of considerable variation in structural details without departing from my invention, and I desire to be understood as claiming the same specifically as is herein illustrated as well as broadly.

Having thus described my invention, what I claim as new and desire to secure by Letters Patent is:

1. In a pipe or hose coupling, the combination of a pair of coupling members, each comprising a supporting frame, a vertically arranged rear plate having a plurality of pipes to be coupled arranged centrally thereof in vertical series, a coupling head, a pair of links made up of telescoping sections, said sections being connected to said rear plate and head by ball-and-socket joints, means for limiting the movement of said link sections upon each other, springs arranged to hold the sections of said links connected to said head normally forward, arms at the rear of said head adapted to be engaged by said links when said head is elevated whereby it is tilted rearwardly, head blocks having a plurality of coupling lips arranged thereon in vertical series, flexible pipes connecting the said pipes to be coupled to said head blocks, said flexible pipes consisting of a plurality of pipe sections connected by ball-and-socket joints, a forwardly projecting conical latch member at one side of said head block having a down-turned hook at its outer end, a corresponding conical socket on the other side of said head block, said socket being open at its inner end to receive the hook of the latch of the opposite coupling member, weights for holding said coupling head normally upward connected thereto at each side whereby the head is normally centered, stops for said weights, spring buffers for said weights, and a chain for limiting the downward movement of said coupling head having a spring interposed therein, all co-acting for the purpose specified.

2. In a pipe or hose coupling, the combination of a pair of coupling members, each comprising a supporting frame, a vertically arranged rear plate having a plurality of pipes to be coupled arranged thereon, a coupling head, a pair of links made up of telescoping sections, said sections being connected to said rear plate and head by ball-and-socket joints, means for limiting the movement of said link sections upon each other, springs arranged to hold the sections of said links connected to said head normally forward, arms at the rear of said head adapted to be engaged by said links when said head is elevated whereby it is tilted rearwardly, a head block having a plurality of coupling lips arranged thereon in a vertical series, flexible pipes connecting the said pipes to be coupled to said head block, a forwardly projecting conical latch member at one side of said head block having a down-turned hook at its outer end, a corresponding conical socket on the other side of said head block, said socket being open at its inner end to receive the hook of the latch of the opposite coupling member, weights for holding said coupling head normally upward connected thereto at each side whereby the head is normally centered, stops for said weights, spring buffers for said weights, and a chain for limiting the downward movement of said coupling head having a spring interposed therein, all co-acting for the purpose specified.

3. In a pipe or hose coupling, the combination of a pair of coupling members, each comprising a supporting frame, a vertically arranged rear plate having a plurality of pipes to be coupled arranged centrally thereof in vertical series, a coupling head, a pair of links made up of telescoping sections, said sections being connected to said rear plate and head by ball-and-socket joints, means for limiting the movement of said link sections upon each other, springs arranged to hold the sections of said links connected to said head normally forward, arms at the rear of said head adapted to be engaged by said links when said head is elevated whereby it is tilted rearwardly, a head block having a plurality of coupling lips arranged thereon in vertical series, flexible pipes connecting the said pipes to be coupled to said head block, said flexible pipes consisting of a plurality of pipe sections connected by ball-and-socket joints, a forwardly projecting conical latch member at one side of said head block having a down-turned hook at its outer end, a corresponding conical socket on the other side of said head block, said socket being open at its inner end to receive the hook of the latch of the opposite coupling member, weights for holding said coupling head normally upward connected thereto at each side whereby the head is normally centered, stops for said weights, and spring buffers for said weights, all co-acting for the purpose specified.

4. In a pipe or hose coupling, the combination of a pair of coupling members, each comprising a supporting frame, a vertically arranged rear plate having a plurality of pipes to be coupled arranged thereon, a coupling head, a pair of links made up of telescoping sections, said sections being connected to said rear plate and head by ball-and-socket joints, means for limiting the movement of said link sections upon each other, springs arranged to hold the sections of said links connected to said head normally forward, arms at the rear of said head adapted to be engaged by said links when said head is elevated whereby it is tilted rearwardly, a head block having a plurality of coupling lips arranged thereon in vertical series, flexible pipes connecting the said pipes to be coupled to said head block, a forwardly projecting conical latch member at one side of said head block having a down-turned hook at its outer end, a corresponding conical socket on the other side of said head block, said socket being open at its inner end to receive the hook of the latch of the opposite coupling member, means for holding said coupling head normally upward, and a chain for limiting the downward movement of said coupling head having a spring interposed therein, all co-acting for the purpose specified.

5. In a pipe or hose coupling, the combination of a pair of coupling members, each comprising a supporting frame, a vertically arranged rear plate having a plurality of pipes to be coupled arranged centrally thereof in vertical series, a coupling head, a pair of links made up of telescoping sections, said sections being connected to said rear plate and head by ball-and-socket joints, means for limiting the movement of said link sections upon each other, springs arranged to hold the sections of said links connected to said head normally forward, arms at the rear of said head adapted to be engaged by said links when said head is elevated whereby it is tilted rearwardly, a head block having a plurality of coupling lips arranged thereon in vertical series, flexible pipes connecting the said pipes to be coupled to said head block, said flexible pipes consisting of a plurality of pipe sections connected by ball-and-socket joints, a forwardly projecting conical latch member at one side of said head block having a down-turned hook at its outer end, a corresponding conical socket on the other side of said head block, said socket being open at its inner end to receive the hook of the latch of the opposite coupling member, means for holding said coupling head normally upward, and a chain for limiting the downward movement of said coupling head having a spring interposed therein, all co-acting for the purpose specified.

6. In a pipe or hose coupling, the combination of a pair of coupling members, each comprising a supporting frame, a vertically arranged rear plate having a plurality of pipes to be coupled arranged thereon, a coupling head, a pair of links made up of telescoping sections, said sections being connected to said rear plate and head by ball-and-socket joints, means for limiting the movement of said link sections upon each other, springs arranged to hold the sections of said links connected to said head normally forward, arms at the rear of said head adapted to be engaged by said links when said head is elevated whereby it is tilted rearwardly, a head block having a plurality of coupling lips arranged thereon in vertical series, flexible pipes connecting the said pipes to be coupled to said head block, a forwardly projecting conical latch member at one side of said head block having a down-turned hook at its outer end, a corresponding conical socket on the other side of said head block, said socket being open at its inner end to receive the hook of the latch of the opposite coupling member, means for holding said coupling head normally upward, and a chain for limiting the downward movement of said coupling head having a spring interposed therein, all co-acting for the purpose specified.

7. In a pipe or hose coupling, the combination of a pair of coupling members, each comprising a supporting frame, a vertically arranged rear plate having a plurality of pipes to be coupled arranged centrally thereof in vertical series, a coupling head, a pair of links made up of telescoping sections, said sections being connected to said rear plate and head by ball-and-socket joints, means for limiting the movement of said link sections upon each other, springs arranged to hold the sections of said links connected to said head normally forward, arms at the rear of said head adapted to be engaged by said links when said head is elevated whereby it is tilted rearwardly, a head block having a plurality of coupling lips arranged thereon in vertical series, flexible pipes connecting the said pipes to be coupled to said head block, said flexible pipes consisting of a plurality of pipe sections connected by ball-and-socket joints, a forwardly conical latch member at one side of said head block having a down-turned hook at its outer end, a corresponding conical socket on the other side of said head block, said socket being open at its inner end to receive the hook of the latch of the opposite coupling member, and means for holding said coupling head normally upward, all-coacting for the purpose specified.

8. In a pipe or hose coupling, the combination of a pair of coupling members, each comprising a supporting frame, a vertically arranged rear plate having a plurality of pipes to be coupled arranged thereon, a coupling head, a pair of links made up of telescoping sections, said sections being connected to said rear plate and head by ball-and-socket joints, means for limiting the movement of said link sections upon each other, springs arranged to hold the sections of said links connected to said head normally forward, arms at the rear of said head adapted to be engaged by said links when said head is elevated whereby it is tilted rearwardly, a head block having a plurality of coupling lips arranged thereon in vertical series, flexible pipes connecting the said pipes to be coupled to said head block, a forwardly projecting conical latch member at one side of said head block having a down-turned hook at its outer end, a corresponding conical socket on the other side of the said head block, said socket being open at its inner end to receive the hook of the latch of the opposite coupling member, and means for holding said coupling head normally upward, all co-acting for the purpose specified.

9. In a pipe or hose coupling, the combination with the supporting frames, of a pair of coupling members, each comprising a vertically arranged rear plate having a plurality of pipes to be coupled arranged thereon in vertical series, a coupling head having a plurality of coupling lips arranged in a vertical series, a pair of links made up of telescoping sections pivotally connected to said rear plate and head, springs for holding said head normally forward, arms at the rear of said head adapted to be engaged by said links when said head is elevated whereby it is tilted rearwardly, flexible pipes connecting the said pipes to be coupled to said head, said flexible pipes consisting of a plurality of pipe sections connected by ball-and-socket joints, a forwardly projecting conical rigid latch member carried by said head having a down-turned hook at its outer end, said head having a corresponding conical socket adapted to receive the latch of the opposite coupling member, means for holding said coupling head normally upward and in a central position, and a chain for limiting the downward movement of said coupling head having a spring interposed therein, for the purpose specified.

10. In a pipe or hose coupling, the combination with the supporting frames, of a pair of coupling members, each comprising a vertically arranged rear plate having a plurality of pipes to be coupled arranged thereon in vertical series, a coupling head, having a plurality of coupling lips arranged in a vertical series, a pair of links made up of telescoping sections pivotally connected to said rear plate and head, springs for holding said head normally forward, arms at the rear of said head adapted to be engaged by said links when said head is elevated whereby it is tilted rearwardly, flexible pipes connecting the said pipes to be coupled to said head, said flexible pipes consisting of a plurality of pipe sections connected by ball-and-socket joints, a forwardly projecting conical rigid latch member carried by said head having a down-turned hook at its outer end, said head having a corresponding conical socket adapted to receive the latch of the opposite coupling member, and means for holding said coupling head normally upward and in a central position, for the purpose specified.

11. In a pipe or hose coupling, the combination with the supporting frames, of a pair of coupling members, each comprising a coupling head having a plurality of coupling lips arranged in a vertical series, a pair of links made up of telescoping sections pivotally connected to said head, springs for holding said head normally forward, arms at the rear of said head adapted to be engaged by said links when said head is elevated whereby it is tilted rearwardly, flexible pipes connecting the pipes to be coupled to said head, means for detachably securing the coupler heads together adapted to be disengaged by the tilting thereof, means for holding said coupling head normally upward and in a central position, and a chain for limiting the downward movement of said coupling head having a spring interposed therein, for the purpose specified.

12. In a pipe or hose coupling, the combination with the supporting frames, of a pair of coupling members, each comprising a coupling head, having a plurality of coupling lips arranged in a vertical series, a pair of links made up of telescoping sections pivotally connected to said head, springs for holding said head normally forward, arms at the rear of said head adapted to be engaged by said links when said head is elevated whereby it is tilted rearwardly, flexible pipes connecting the pipes to be coupled to said head, means for detachably securing the coupler heads together adapted to be disengaged by the tilting thereof, and means for holding said coupling head normally upward and in a central position, for the purpose specified.

13. In a pipe or hose coupling, the combination with the supporting frames, of a pair of coupling members, each comprising a coupling head having a plurality of coupling lips arranged in a vertical series, a pair of links made up of telescoping sections pivotally connected to said head, springs for holding said head normally forward, arms at the rear of said head adapted to be engaged by said links when said head is elevated whereby it is tilted rearwardly, flexible pipes connecting the pipes to be coupled to said head, means for holding said coupling head normally upward and in a central position, and a chain for limiting the downward movement of said coupling head having a spring interposed therein, for the purpose specified.

14. In a pipe or hose coupling, the combination with supporting frames, of a pair of coupling members, each comprising a coupling head, having a plurality of coupling lips arranged in a vertical series, a pair of links made up of telescoping sections pivotally connected to said head, springs for holding said head normally forward, arms at the rear of said head adapted to be engaged by said links when said head is elevated whereby it is tilted rearwardly, flexible pipes connecting the pipes to be coupled to said head, and means for holding said coupling head normally upward and in a central position, for the purpose specified.

15. In a pipe or hose coupling, the combination with the supporting frame, of a pair of coupling members, each comprising a coupling head having a plurality of coupling lips arranged thereon in a vertical series, means for holding said head yieldingly forward and upward, means for automatically tilting said head rearwardly when in its elevated position, a forwardly projecting rigid latch carried by said head, said head also having a corresponding socket adapted to receive the latch of the opposite coupling member whereby said heads are guided and secured together, for the purpose specified.

16. In a pipe or hose coupling, the combination with the supporting frame, of a pair of coupling members, each comprising a coupling head having a plurality of coupling lips arranged thereon in a vertical series, means for holding said head yieldingly forward, a forwardly projecting rigid latch carried by said head, said head also having a corresponding socket adapted to receive the latch of the opposite coupling member whereby said heads are guided and secured together, for the purpose specified.

17. In a pipe or hose coupling, the combination with the supporting frame, of a pair of coupling members, each comprising a coupling head having a plurality of coupling lips arranged thereon in a vertical series, means for holding said head yieldingly forward and upward, means for automatically tilting said head rearwardly when in its elevated position, and means for detachably securing the coupler heads together adapted to be automatically disengaged by the tilting thereof, for the purpose specified.

18. In a pipe or hose coupling, the combination with the supporting frame, of a pair of coupling members, each comprising a tiltably mounted coupling head having a plurality of coupling lips arranged thereon in a vertical series, means for holding said head yieldingly forward, and means for detachably securing the coupler heads together, for the purpose specified.

19. In a pipe or hose coupling, the combination with the supporting frame, of a pair of coupling members, each comprising a coupling head having a plurality of coupling lips arranged thereon in vertical series, means for adjustably supporting said head, means for automatically tilting said head rearwardly when in its elevated position, a forwardly projecting latch carried by said head, said head also having a corresponding socket adapted to receive the latch of the opposite coupling member whereby said heads are guided and secured together, for the purpose specified.

20. In a pipe or hose coupling, the combination with the supporting frame, of a pair of coupling members, each comprising a coupling head having a plurality of coupling lips arranged thereon in vertical series, means for adjustably supporting said head, means for automatically tilting said head rearwardly when in its elevated position, and means for detachably securing said heads together adapted to be automatically disengaged by the tilting thereof, for the purpose specified.

21. In a pipe or hose coupling the combination with the supporting frame, of a pair of coupling members, each comprising a coupling head having a plurality of coupling lips arranged thereon in vertical series, means for adjustably supporting said head, and a forwardly projecting latch carried by said head, said head also having a corresponding socket adapted to receive the latch of the opposite coupling member whereby said heads are guided and secured together, for the purpose specified.

22. In a pipe or hose coupling, the combination with the supporting frame, of a pair of coupling members, each comprising a tiltably mounted coupling head having a plurality of coupling lips arranged thereon in a vertical series, means for adjustably supporting said head, and means for detachably securing said heads together, for the purpose specified.

23. In a pipe or hose coupling, the combination with the supporting frame, of a pair of coupling members, each comprising a vertically arranged rear plate having a plurality of pipes to be coupled arranged thereon in vertical series, a coupling head, having a plurality of coupling lips arranged in a vertical series, flexible pipes connecting the said pipes to be coupled to said head, said flexible pipes consisting of a plurality of pipe sections connected by ball-and-socket joints, and means for detachably securing said heads together, for the purpose specified.

24. In a pipe or hose coupling, the combination with the supporting frames, of a pair of coupling members, each comprising a rear plate having a plurality of pipes to be coupled arranged thereon, a coupling head having a plurality of coupling lips arranged in a vertical series, flexible pipes connecting the said pipes to be coupled to said head, said flexible pipes consisting of a plurality of pipe sections connected by ball-and-socket joints, and means for detachably securing said heads together, for the purpose specified.

25. In a pipe or hose coupling members, the combination with a frame, of a coupling head; a link made up of telescoping sections pivotally connected to said frame and head; springs for holding said head normally forward; an arm at the rear of said head adapted to be engaged by said link when said head is elevated whereby it is tilted rearwardly; a forwardly projecting rigid conical latch on said head having a down-turned hook at its outer end, said head also having a corresponding conical socket adapted to receive the latch of the opposite coupling member, and means for holding said coupling head normally upward and in a central position, for the purpose specified.

26. In a pipe or hose coupling member, the combination with a frame, of a coupling head; a link made up of telescoping sections pivotally connected to said frame and head; springs for holding said head normally forward; an arm at the rear of said head adapted to be engaged by said link when said head is elevated whereby it is tilted rearwardly; and means for detachably securing the coupling heads together adapted to be automatically released upon the tilting thereof, for the purpose specified.

27. In a pipe or hose coupling, the combination with a frame, of a coupling head; means for holding said head yieldingly forward and upward; means for automatically tilting said head when in its elevated position; and a forwardly projecting latch carried by said head, said head also having a corresponding socket adapted to receive the latch of the opposite coupling member whereby said heads are guided and secured together adapted to be automatically disengaged by the tilting of the heads.

28. In a pipe or hose coupling, the combination with a frame, of a coupling head; means for holding said head yieldingly forward; and a forwardly projecting latch carried by said head, said head also having a corresponding socket adapted to receive the latch of the opposite coupling member whereby said heads are guided and secured together adapted to be disengaged by the tilting of the heads.

29. In a pipe or hose coupling, the combination with a frame, of a coupling head; means for holding said head yieldingly forward and upward; means for automatically tilting said head when in its elevated position; and means for securing said head to the opposite coupling member adapted to be automatically disengaged upon the tilting of said head.

30. In a pipe or hose coupling, the combination with a frame, of a coupling head; means for holding said head yieldingly forward; and means for securing said head to the opposite coupling member adapted to be automatically disengaged upon the tilting of said head.

31. In a pipe or hose coupling, the combination with a frame, of a coupling head; means for adjustably supporting said head; means for automatically tilting said head when in its elevated position; and a forwardly projecting conical latch member carried by said head, said head also having a corresponding conical socket adapted to receive the latch of the opposite coupling member whereby the heads are guided and secured together, for the purpose specified.

32. In a pipe or hose coupling, the combination with a frame, of a coupling head; means for adjustably supporting said head; and a forwardly projecting conical latch carried by said head, said head also having a corresponding conical socket adapted to receive the latch of the opposite coupling member whereby the heads are guided and secured together, for the purpose specified.

33. In a pipe or hose coupling, the combination with a frame, of a coupling head; means for adjustably supporting said head; and means for automatically tilting said head when in its elevated position, for the purpose specified.

34. In a coupling for the pipes of railway trains, the combination with the train pipes to be coupled, of a pair of coupling members to which the train pipes are connected having a plurality of coupling lips arranged thereon in a vertical series; means for holding said coupling members yieldingly forward and upward; means for automatically securing said coupling members together when in their depressed position adapted to be automatically released when said coupling members are in their elevated position, said coupling members being arranged to engage each other and to be forced to their depressed position by the coupling of the cars.

35. In a coupling for the pipes of railway trains, the combination with the train pipes to be coupled, of a pair of coupling members to which the train pipes are connected having a plurality of inturned flange-like coupling lips of resilient material arranged thereon in a vertical series; and means for detachably securing said coupling members together.

36. In a pipe or hose coupling, the combination with a pair of coupling heads, of means for holding said heads yieldingly together; and means for automatically tilting said heads when drawn apart.

37. In a pipe or hose coupling, the combination of a coupling head; means for securing said head to the opposite coupling member; and means for automatically tilting said head when the same is separated from the opposite member for disengaging said securing means.

In witness whereof, I have hereunto set my hand and seal in the presence of two witnesses.

JOHN HENRY PHILLIPS, Jr. [L. S.]

Witnesses:
   D. J. WILLSON,
   A. M. BAKER.